United States Patent
Kwon et al.

(10) Patent No.: US 7,090,821 B2
(45) Date of Patent: Aug. 15, 2006

(54) METAL OXIDE POWDER FOR HIGH PRECISION POLISHING AND METHOD OF PREPARATION THEREOF

(75) Inventors: Hyukjin Kwon, Suwon-si (KR); Myungho Ahn, Seoul (KR); Youngkwon Joung, Seoul (KR); Inyeon Lee, Seoul (KR)

(73) Assignee: Samsung Corning Co., Ltd., (KR)

( * ) Notice: Subject to any disclaimer, the term of this patent is extended or adjusted under 35 U.S.C. 154(b) by 526 days.

(21) Appl. No.: 10/456,685

(22) Filed: Jun. 5, 2003

(65) Prior Publication Data

US 2003/0228248 A1  Dec. 11, 2003

(30) Foreign Application Priority Data

Jun. 5, 2002 (KR) ............... 10-2002-0031526

(51) Int. Cl.
*C01G 1/00* (2006.01)
*C09G 1/00* (2006.01)

(52) U.S. Cl. .......... 423/592.1; 423/625; 423/335; 423/337; 423/608; 423/618; 423/605; 423/263; 423/610; 423/622; 106/3; 51/307; 51/308; 51/309

(58) Field of Classification Search ......... 423/625, 423/335, 337, 592.1, 608, 618, 605, 263, 423/610, 622; 106/3; 51/307, 308, 309

See application file for complete search history.

(56) References Cited

U.S. PATENT DOCUMENTS

| 6,120,571 | A  | * | 9/2000 | Aihara et al. ............... 51/309 |
| 6,364,919 | B1 | * | 4/2002 | Lee et al. ................... 51/309 |
| 6,562,092 | B1 | * | 5/2003 | Ito et al. ..................... 51/309 |
| 6,596,042 | B1 | * | 7/2003 | Feng et al. .................. 51/309 |
| 6,818,030 | B1 | * | 11/2004 | Feng et al. .................. 51/307 |
| 2003/0162398 | A1 | * | 8/2003 | Small et al. ................ 438/692 |
| 2003/0206854 | A1 | * | 11/2003 | Gutsch et al. ............. 423/625 |
| 2004/0159050 | A1 | * | 8/2004 | Pasqualoni et al. ......... 51/307 |

FOREIGN PATENT DOCUMENTS

WO   WO 99/59754   * 11/1999

* cited by examiner

*Primary Examiner*—Timothy Vanoy
(74) *Attorney, Agent, or Firm*—Anderson Kill & Olick, PC

(57) ABSTRACT

The present invention relates to a metal oxide powder for high precision polishing and prepartion thereof, comprising aggregates formed by cohesion of primary particles, which has a cohesive degree ($\alpha$) of 1.1 to 2.0 and a cohesive scale ($\beta$) of 3 to 10, the cohesive degree ($\alpha$) and the cohesive scale ($\beta$) being defined by formula (I) and formula (II), respectively:

$$\alpha = 6/(S \times \rho \times d(XRD)) \quad (I)$$

$$\beta = \text{weight average particle diameter}/d(XRD) \quad (II)$$

wherein, S is the specific surface area of the powder; $\rho$, the density; and d(XRD), the particle diameter of the powder determined by X-ray diffraction analysis. In accordance with the present invention, it is possible to provide a high polishing speed and reduce scratches.

12 Claims, 4 Drawing Sheets

METAL OXIDE POWDER FOR HIGH PRECISION POLISHING AND METHOD OF PREPARATION THEREOF

FIELD OF THE INVENTION

The present invention relates to a metal oxide powder for high precision polishing and a method for preparing same.

BACKGROUND OF THE INVENTION

A process called chemical mechanical polishing (CMP) is commonly carried out for polishing the surface of a semiconductor device, display panel e.g. of LCD, lens, hard disk substrate, metal, etc., using various polishing powders composed mostly of metal oxides dispersed in water or an organic solvent with a proper abrasive pad. Such metal oxides used in CMP include silica($SiO_2$), alumina($Al_2O_3$), ceria($CeO_2$), zirconia($ZrO_2$), tin oxide($SnO_2$) and manganese oxide($MnO_2$), and a variety of polishing powders have been continuously developed in response to the increasing demand by precision electronic industries for high precision polishing.

Two important performance parameters in CMP are the polishing speed and the quality of polished surface, i.e., absence of scratches, and these parameters depend primarily on the size and shape of polishing particles.

As the size of particles increases, the polishing speed increases but creates more scratches. Therefore, the size of polishing particles is controlled by balancing the required quality of the polished surface and the polishing speed. Generally, the maximum size of polishing particles for high precision polishing is 1 μm or less. For polishing semiconductor devices and display panels which require utmost high precision, submicron to nanometer hyperfine polishing agents have been used to minimize the occurrence of scratches.

As to the shape of polishing agents, it is preferred to make the shape of particles irregular so that the contact area between the particle surface and the substrate surface can be maximized. By making the shape of particles irregular without increasing the particle size, the polishing speed can be enhanced without producing scratches. The irregular particle shape is formed by aggregating primary particles smaller than the desired particles size through relatively weak cohesive interaction. Excessively strong cohesiveness of such aggregates lead to increased scratches.

Conventional techniques for preparing metal oxide nano particles used in polishing are based on precipitation, gaseous synthesis and milling, and such techniques generally produce a significant amount of massive aggregates of smaller particles which must be removed.

To avoid such a problem, PCT International publication No. WO 99/59754 (The University of Western Australia) discloses a spherical polishing agent produced by adding a diluent such as NaCl, $CaCl_2$, $MgCl_2$, $Na_2SO_4$, $Na_2CO_3$, $Ca(OH)_2$, CaO, MgO to a metal compound and milling to prevent the metal compound particles from agglomerating. Such diluents do not react with metal compounds and can be easily removed by washing with a solvent. However, the metal oxide particles produced by this procedure are not of desirable irregular shape for providing a high polishing speed. This is considered to arise from the fact that the concentration of the diluent used is excessively high, 80 vol % or more based on the total volume of the metal oxide-diluent mixture, which leads to non-aggregated, highly dispersed nano particles.

Accordingly, the present inventors have endeavored to develop an improved metal oxide powder- for polishing and found that aggregates of primary spherical particles having irregular particle shape can be produced by a carefully controlled procedure and used for high-speed, high-precision polishing.

SUMMARY OF THE INVENTION

It is, therefore, an object of the present invention to provide a metal oxide powder for high-precision, high-speed polishing without producing scratches.

It is another object of the present invention to provide a method for preparing said metal oxide powder.

It is a further object of the present invention to provide a polishing agents comprising said metal oxide powder.

In accordance with one aspect of the present invention, there is provided a metal oxide powder comprising aggregates formed by cohesion of primary particles, which has a cohesive degree (α) of 1.1 to 2.0 and a cohesive scale (β) of 3 to 10, the cohesive degree (α) and the cohesive scale (β) being defined by formula (I) and formula (II), respectively:

$$\alpha = 6/(S \times \rho \times d(XRD)) \qquad (I)$$

$$\beta = \text{weight average particle diameter}/d(XRD) \qquad (II)$$

wherein, S is the specific surface area of the powder; ρ, the density; and d(XRD), the particle diameter of the powder determined by X-ray diffraction analysis.

In accordance with another aspect of the present invention, there is provided a method for preparing said metal oxide powder, comprising mixing a diluent with a metal oxide precursor to produce a mixture having a diluent content in the range of 40 to 70 wt %, and milling the mixture, calcining the milled mixture, and removing the diluent from the calcined mixture by water washing.

BRIEF DESCRIPTION OF THE DRAWINGS

The above and other objects and features of the present invention will become apparent from the following description thereof, when taken in conjunction with the accompanying drawings, which respectively show.

DETAILED DESCRIPTION OF THE INVENTION

Figure 1A:
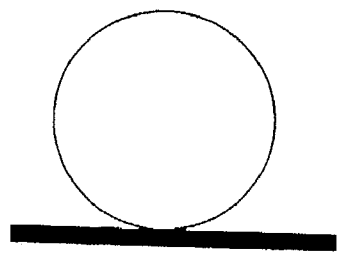
FIGS. 1A–1C: schematical shapes of metal oxide particles having different primary particles and cohesive states.

The cohesive degree (α) described in the present invention can be calculated based on the specific surface area, the density and the particle diameter of a powder. The particle diameter (d(XRD)) of a powder can be calculated from SCHERRER equation of formula (III) by evaluating the peak half width of an XRD scan. The particle diameter thus determined represents the crystallite size and when it is 0.1 μm or less, the crystallites are regarded as primary particles.

$$d(XRD) = 0.9 \times \lambda/(B \times \cos \theta) \qquad (III)$$

wherein λ represents the X-ray wave length (Cu Kα ray: 1.54056 Å); B, the half width compensating apparatus properties; and θ, Bragg angle.

Also, the specific surface area (S), the surface area per unit weight of a powder, can be measured by determining the amount of a gas adsorbed at a low temperature. Generally, the surface area increases as the particle size decreases. However, when the particles become cohesive, the surface area decreases relative to the surface area loss due to contact between particles.

Calculated α value is divided into the following three classes of cohesive degree of metal oxide particles:

0.9~1.1: little cohesiveness;
1.1~2.0: weak cohesiveness or porous cohesiveness; and
>2.0: strong cohesiveness, conglomerate or poly-crystalline powder.

The α value represents the ratio of the diameter derived from the specific surface area and the diameter of the primary particles. A powder composed of a single particle has an α value of 1 or more while other powders have α values of 1 or less since the specific surface area-derived diameter represents an area average particle diameter, and d(XRD), the weight-derived particle diameter. Accordingly, if the α value is small, non-agglomerated, independent primary particles are present without losing specific surface area due to interparticle cohesion, and if the α value is large, primary particles are sticking together to form aggregates having a decreased specific surface area due to the cohesion of particles.

Also, the cohesive scale (β) of a powder is calculated by formula (II) based on the weight average particle diameter and d(XRD). The weight average particle diameter determined with Microtrac UPA150 is an average value of the size of particles suspended in water obtained by evaluating the diffraction or wave distortion after irradiating with a laser or ultrasonic wave, and it represents the size of cohesive aggregates of primary particles since it represents the size of separate particles dispersed in water. Accordingly, the cohesive size or the number of the primary particles that aggregate to form a cohesive particles can be calculated from the weight average particle diameter and d(XRD).

The β value thus calculated is divided into the following four classes of cohesive scale:

1~3: little aggregates;
3~10: small aggregates;
10~20: large aggregates; and
>20: massive aggregates or poly-crystalline powder.

When two or more powders having the same weight average particle diameter are compared, the β values thus calculated can be used to delineate how the aggregate shape varies. If the β value is large, the primary particles are much smaller in size than the weight average particle diameter, and if the β value is small, the powder is made of particles not significantly smaller in size than the weight average particle diameter.

The grape cluster-shaped metal oxide powder of the present invention has a cohesive degree (α) of 1.1 to 2.0 and a cohesive scale (β) of 3 to 10, which means that the metal oxide powder of the present invention is of the shape of small clusters of particles formed by weak cohesion.

Individual primary particle of the metal oxide powder of the present invention is bound, on the average, to 2 to 3 adjacent primary particles to form irregular shaped clusters (secondary particles). If such number (herein after, coordination number) is more than 3, undesirably densely packed clusters are formed.

The metal oxide powders of the present invention include powders of alumina, silica, ceria, zirconia, tin oxide, manganese oxide and a mixture thereof, the average particle diameter thereof being in the range of 10 to 200 nm.

According to another aspect of the present invention, the present invention provides a method for preparing a metal oxide nano powder having a desired cohesive degree and scale by mixing a diluent with a metal oxide precursor, the diluent content of the mixture being in the range of 40 to 70 wt %, milling the resulting mixture and calcining the milled mixture at a temperature of 500 to 1200° C. to form secondary particles having irregular grape cluster-shape made of primary particles. If the diluent content is less than 40 wt %, excessively agglomerated particles that tend to create scratches on polishing are produced, while if the diluent content is more than 70 wt %, very weakly aggregated particles are produced and such particles are not suitable for enhancing the polishing speed.

The metal oxide precursors which may be used in the present invention include hydroxide, carbonate, nitrate, chloride, acetate, hydrate, alkoxide and sulphide of a metal selected from the group consisting of Al, Ce, Si, Zr, Ti, Mn, Sn and Zn. Also, diluents which may be used in the present invention include $K_2CO_3$, NaCl, $CaCl_2$, $MgCl_2$, $Na_2SO_4$, $Na_2CO_3$, $Ca(OH)_2$, KCl and $K_2SO_4$.

The calcined powder obtained by the above procedure still contains the diluent which is subsequently removed by washing with water until the electrical conductivity of the wash water becomes 10 μS/cm or less.

Figure 1B:
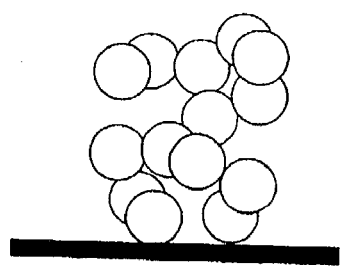
Figure 1C:
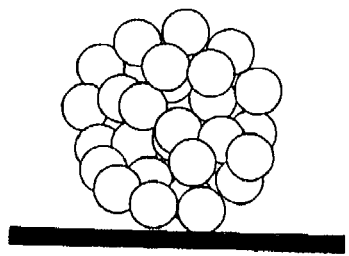

FIG. 1B shows a schematic shape of the metal oxide powder particle of the present invention; a secondary particle having an irregular grape-cluster shape made of primary spherical particles (the average coordination number of primary particles is 2 to 3). For comparision, FIGS. 1A and 1C show schematic shapes of two other types of metal oxide particles having the same weight average particle diameter as the inventive particle; one being a large primary particle and the other, a highly agglomerated particle (the average coordination number of the primary particles is much higher than 3), respectively.

The spherical particle shown in FIG. 1A has a small contact area with a polishing surface. The properly cohered particle shown in FIG. 1B has a much smaller weight but a larger contact area than the particle of FIG. 1A, which makes it possible to enhance the polishing speed, while the easily breakable secondary particle do not create scratches on the polishing surface. The excessive agglomerated particle shown in FIG. 1C exhibits similar characteristics as the particle of FIG. 1A.

Therefore, the metal oxide powder of the present invention which is made of primary spherical particles clustered together to form secondary particles of an irregular grape cluster-shape can be advantageously used for high precision polishing of a semiconductor device, substrate for LCD, substrate for organoluminescence, mechanical and optical elements.

The present invention will be described in further detail with reference to Examples. However, it should be understood that the present is not restricted by the specific Examples.

EXAMPLE 1

50 g of a mixture of cerium hydroxide (Aldrich, 99.9% pure) and sodium chloride (Aldrich, 99.9% pure) having a mix ratio of 20:80 by weight was dried at 150° C., placed in a 600 ml steel container together with 1000 g of a 6 mm stainless steel ball media, pulverized using a Planetary Mill for 2 hours, and heated at 750° C. for 4 hours. The powder was poured in distilled water to dissolve and remove the diluent, and washed until the electrical conductivity of the wash water became 10 µS/cm or less, to obtain a ceria powder. The above procedure was repeated using cerium hydroxide-sodium chloride mixtures having mix ratios of 30:70, 40:60 and 70:30 by weight, respectively.

Each of the four powder samples thus prepared was wet-pulverized using an agitation mill (SPEX8000) for 30 minutes. The particle diameter of each powder was determined with an X-ray diffractometer (Bruker D8 Discover); the specific surface area, with Micromeritics ASAP2010; and the weight average particle diameter, with Microtrac UPA150. The measurement results were used to calculate the cohesive degree($\alpha$) and the cohesive scale($\beta$) according to formulas (I) and (II).

Each of the four powder samples was subsequently dispered in water to a concentration of 1 wt % and a piece of silicon wafer having a $SiO_2$ film formed thereon was placed therein and polished at 120 rpm under a pressure of 10 dpsi with Rodel IC1400 pad. The polishing speed was evaluated by measuring the thickness of the $SiO_2$ film with Plasmos SD2002LA and the number of scratches per unit area of the polished silicon wafer surface was optically evaluated with Tamcor KLA microscope.

Figure 2:
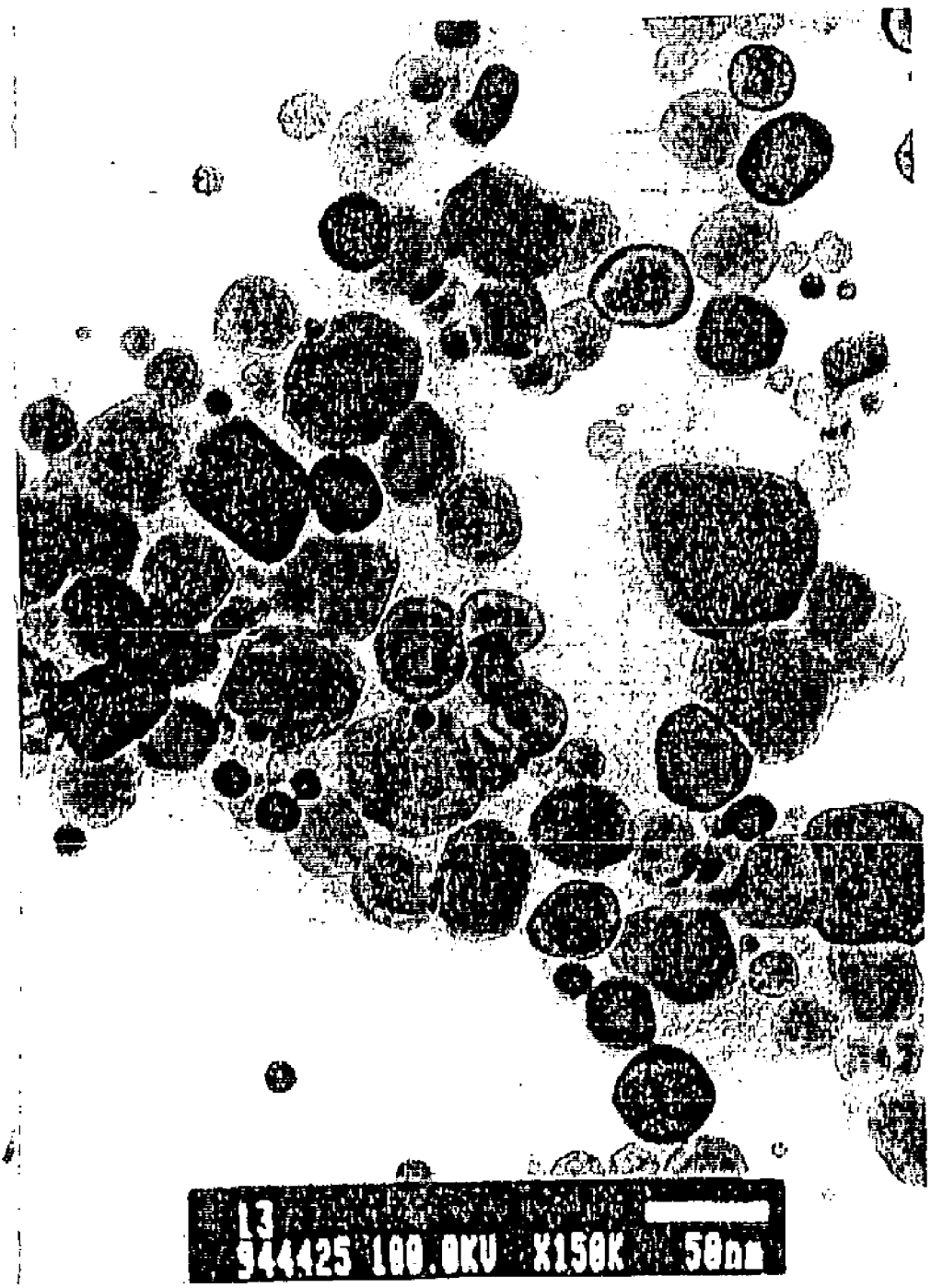
FIG. 2: a transmission electron microscope (TEM) photograph of the inventive powder sample (1-2) prepared in Example 1.
Figure 3:
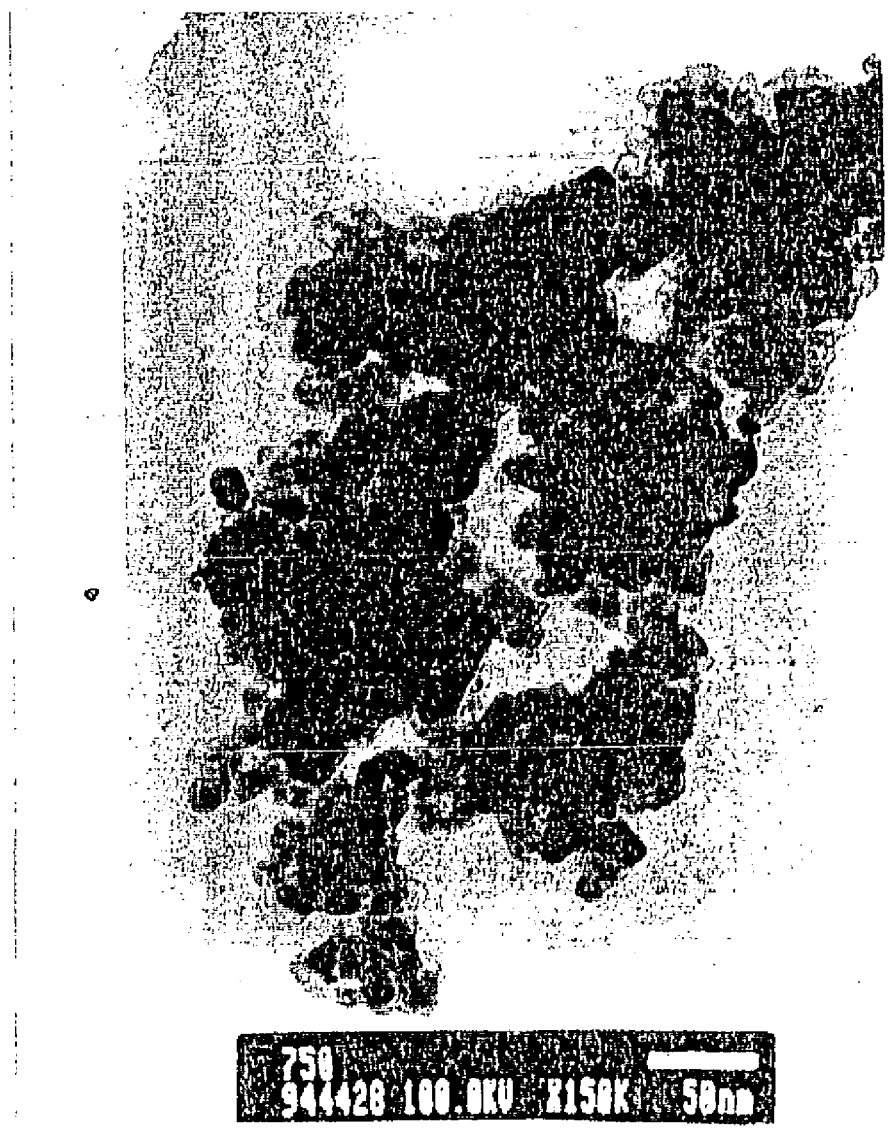
FIG. 3: a TEM photograph of the comparative powder sample (1-4) prepared in Example 1.

The results thus obtained are shown in Table 1 and TEM photographs of ceria powders corresponding to samples (1-2) and (1-4) in Table 1 are shown in FIGS. 2 and 3, respectively.

Also, as can be seen from FIGS. 2 and 3, ceria powder sample (1-2) in accordance with the present invention exhibits aggregates having an average primary particle coordination number of 2.4, while the aggregates of sample (1-4) have an average primary particle coordination number of 4 or more.

EXAMPLE 2

A mixture of 500 g of cerium hydroxide (Aldrich, 99.9% pure) and 500 g of sodium chloride (Aldrich, 99.9% pure) was dried at 150° C., placed in a 10 L attrition mill together with 20 kg of a 6 mm stainless steel ball media, pulverized at 100 rpm for 1 hour, and heated at 760° C. for 4 hours. The powder was poured in distilled water to dissolve and remove sodium chloride and washed until the electrical conductivity of the wash water became 10 µS/cm or less, to obtain a ceria powder. The ceria powder sample thus obtained was wet-pulverized in a 2 L bead mill containing a 0.3 mm zirconia media for 30 minutes, and its cohesive degree($\alpha$) and cohesive scale($\beta$) were calculated by the procedure of Example 1.

Figure 4:
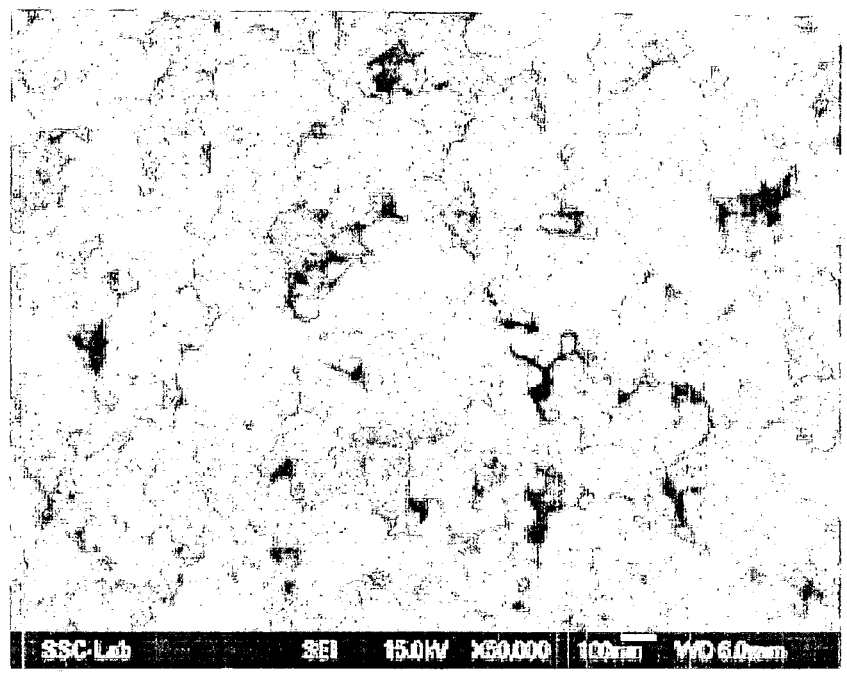
FIG. 4: a TEM photograph of the inventive powder sample prepared in Example 2.

The result thus obtained is shown in Table 2, and a TEM photograph of the obtained ceria powder, in FIG. 4.

TABLE 2

| Cerium hydroxide:Sodium chloride (w/w) | Particle diameter (nm) | Specific surface area ($m^2/g$) | Weight average particle diameter (nm) | $\alpha$ | $\beta$ | Polishing speed (nm/min.) | No. of scratches (/wafer) |
|---|---|---|---|---|---|---|---|
| 50:50 | 42.6 | 10.34 | 328 | 1.91 | 7.7 | 378 | 124 |

As can be seen from Table 2, the ceria powder sample has a cohesive degree($\alpha$) and a cohesive scale($\beta$) within the ranges defined in the present invention and exhibits a high polishing speed as well as low scratches.

EXAMPLE 3

The procedure of Example 1 was repeated except that aluminum hydroxide (Aldrich, 99.9% pure)-sodium chloride mixtures of varying mix ratios were used in place of cerium

TABLE 1

| Sample | Cerium hydroxide:Sodium chloride (w/w) | Particle diameter (nm) | Specific surface area ($m^2/g$) | Weight average particle diameter (nm) | $\alpha$ | $\beta$ | Polishing speed (nm/min.) | No. of scratches (/wafer) | Note |
|---|---|---|---|---|---|---|---|---|---|
| 1-1 | 20:80 | 22 | 38.2 | 150 | 1.0 | 6.8 | 186 | 152 | comparative |
| 1-2 | 30:70 | 26 | 31.3 | 193 | 1.2 | 7.4 | 290 | 170 | inventive |
| 1-3 | 40:60 | 25 | 21.4 | 246 | 1.6 | 9.8 | 261 | 239 | inventive |
| 1-4 | 70:30 | 26 | 14.7 | 312 | 2.2 | 12.0 | 211 | 428 | comparative |

As can be seen from Table 1, ceria powder samples (1-2) and (1-3) which have cohesive degree($\alpha$) and cohesive scale($\beta$) within the preferred range in accordance with the present invention exhibit a high polishing speed and low scratches, while sample (1-1) having a low cohesiveness gives a low polishing speed and sample (1-4) having excessively high cohesiveness lead to many scratches.

hydroxide-sodium chloride mixtures to obtain six alumina powder samples. Each of the six alumina powder samples thus prepared was wet-pulverized using an agitation mill (SPEX8000) for each different time to same weight average particle diameter, and the cohesive degree($\alpha$) and cohesive scale($\beta$) were calculated by the procedure of Example 1. The results are shown in Table 3.

TABLE 3

| Sample | Cerium hydroxide:Sodium chloride (w/w) | Particle diameter (nm) | Specific surface area (m²/g) | Weight average particle diameter (nm) | α | β | Polishing speed (nm/min.) | No. of scratches (/wafer) | Note |
|---|---|---|---|---|---|---|---|---|---|
| 3-1 | 20:80 | 25 | 57.7 | 255 | 1.04 | 10.2 | 90 | 521 | Comparative |
| 3-2 | 30:70 | 45 | 50.0 | 257 | 1.11 | 5.71 | 250 | 267 | Inventive |
| 3-3 | 40:60 | 42 | 28.3 | 242 | 1.26 | 5.76 | 390 | 254 | Inventive |
| 3-4 | 50:50 | 55 | 18.8 | 248 | 1.45 | 4.51 | 450 | 202 | Inventive |
| 3-5 | 60:40 | 78 | 11.5 | 243 | 1.67 | 3.12 | 370 | 287 | Inventive |
| 3-6 | 70:30 | 102 | 7.1 | 240 | 2.08 | 2.35 | 220 | 710 | Comparative |

As can be seen from Table 3, alumina powder samples (3-2) to (3-5) produced at a diluent content of 40 to 70 wt % have cohesive degree(α) and cohesive scale(β) values within the specified range in accordance with the present invention, and show a high polishing speed together with low scratches. Sample (3-1) having a low cohesiveness and sample (3-6) having an excessive cohesiveness exhibit low polishing speeds and high scratch numbers.

While the invention has been described with respect to the above specific embodiments, it should be recognized that various modifications and changes may be made to the invention by those skilled in the art which also fall within the scope of the invention as defined by the appended claims.

What is claimed is:

1. A metal oxide powder comprising aggregates formed by cohesion of primary particles which has a cohesive degree (α) of 1.1 to 2.0 and a cohesive scale (β) of 3 to 10, the cohesive degree (α) and the cohesive scale (β) being defined by formula (I) and formula (II), respectively:

$$\alpha = 6/(S \times \rho \times d(XRD)) \quad (I)$$

$$\beta = \text{weight average particle diameter}/d(XRD) \quad (II)$$

wherein, S is the specific surface area of the powder; ρ, the density; and d(XRD), the particle diameter of the powder determined by X-ray diffraction analysis.

2. The metal oxide powder of claim 1, wherein the individual primary particle, on the average, is cohesively bound to 2 to 3 adjacent primary particles.

3. The metal oxide powder of claim 1, wherein the metal oxide is selected from the group consisting of alumina, silica, ceria, zirconia, tin oxide, manganese oxide and a mixture thereof.

4. The metal oxide powder of claim 1, wherein the average particle diameter of the metal oxide powder ranges from 10 to 200 nm.

5. A method for preparing the metal oxide powder of claim 1, comprising mixing a diluent with a metal oxide precursor to produce a mixture having a diluent content in the range of 40 to 70 wt %, milling the mixture, calcining the milled mixture, and removing the diluent from the calcined mixture by water washing.

6. The method of claim 5, wherein the metal oxide precursor is a hydroxide, carbonate, nitrate, chloride, acetate, hydrate, alkoxide, or sulphide of a metal selected from the group consisting of Al, Ce, Si, Zr, Ti, Mn, Sn and Zn.

7. The method of claim 5, wherein the diluent is selected from the group consisting of $K_2CO_3$, NaCl, $CaCl_2$, $MgCl_2$, $Na_2SO_4$, $Na_2CO_3$, $Ca(OH)_2$, KCl, $K_2SO_4$ and a mixture thereof.

8. The method of claim 5, wherein the water washing is carried out until the electrical conductivity of the wash water becomes 10 μS/cm or less.

9. A polishing agent comprising the metal oxide powder according to claim 1.

10. A polishing agent comprising the metal oxide powder according to claim 2.

11. A polishing agent comprising the metal oxide powder according to claim 3.

12. A polishing agent comprising the metal oxide powder according to claim 4.

* * * * *